United States Patent
Bohne et al.

(10) Patent No.: US 11,130,480 B2
(45) Date of Patent: Sep. 28, 2021

(54) APPARATUS AND METHOD FOR OPERATING AN ELECTRIC PARKING BRAKE OF A VEHICLE

(71) Applicant: Robert Bosch GmbH, Stuttgart (DE)

(72) Inventors: Christian Bohne, Stuttgart (DE); Matthew Nimmo, Ludwigsburg (DE); Norbert Kearney, Abstatt (DE); Steffen Ackermann, Vaihingen/Enz (DE); Steffen Zechmeister, Bad Wimpfen (DE)

(73) Assignee: Robert Bosch GmbH, Stuttgart (DE)

( * ) Notice: Subject to any disclaimer, the term of this patent is extended or adjusted under 35 U.S.C. 154(b) by 11 days.

(21) Appl. No.: 16/547,711

(22) Filed: Aug. 22, 2019

(65) Prior Publication Data

US 2020/0086841 A1    Mar. 19, 2020

(30) Foreign Application Priority Data

Sep. 14, 2018    (DE) ..................... 10 2018 215 700.6

(51) Int. Cl.
| | |
|---|---|
| *B60T 7/08* | (2006.01) |
| *B60T 13/66* | (2006.01) |
| *B60T 13/58* | (2006.01) |
| *B60T 13/74* | (2006.01) |
| *B60T 7/10* | (2006.01) |

(52) U.S. Cl.
CPC ............. *B60T 13/662* (2013.01); *B60T 7/107* (2013.01); *B60T 13/588* (2013.01); *B60T 13/741* (2013.01)

(58) Field of Classification Search
CPC ...... B60T 13/58; B60T 13/588; B60T 13/662; B60T 13/741; B60T 7/085; B60T 7/107
USPC ............................ 303/3, 15, 20; 701/70–72
See application file for complete search history.

(56) References Cited

U.S. PATENT DOCUMENTS

| | | | | |
|---|---|---|---|---|
| 2010/0314934 | A1* | 12/2010 | Leiter | B60T 13/746 303/20 |
| 2012/0073922 | A1* | 3/2012 | Kaestner | B60W 20/00 188/70 R |
| 2013/0282249 | A1* | 10/2013 | Heise | B60T 13/588 701/70 |
| 2019/0232790 | A1* | 8/2019 | Honda | B60L 7/26 |
| 2019/0299944 | A1* | 10/2019 | Nilsson | B60W 10/192 |
| 2020/0070788 | A1* | 3/2020 | Michels | B60T 13/74 |

FOREIGN PATENT DOCUMENTS

| | | |
|---|---|---|
| DE | 10 2011 084 534 A1 | 4/2012 |
| DE | 10 2013 208 671 A1 | 11/2014 |
| EP | 1302371 A2 * | 4/2003 ............... H02J 1/10 |

* cited by examiner

*Primary Examiner* — Christopher P Schwartz
(74) *Attorney, Agent, or Firm* — Maginot, Moore & Beck LLP

(57) ABSTRACT

An apparatus for operating an electric parking brake of a vehicle includes a generator and a control device. The generator is designed to provide energy for supplying the electric parking brake of the vehicle with energy, and the control device is designed to activate the generator for supplying the electric parking brake with energy depending on a result of a monitoring of an energy supply to the electric parking brake.

10 Claims, 3 Drawing Sheets

APPARATUS AND METHOD FOR OPERATING AN ELECTRIC PARKING BRAKE OF A VEHICLE

This application claims priority under 35 U.S.C. § 119 to application no. DE 10 2018 215 700.6, filed on Sep. 14, 2018 in Germany, the disclosure of which is incorporated herein by reference in its entirety.

The disclosure relates to an apparatus and a method for operating an electric parking brake of a vehicle.

BACKGROUND

DE 10 2013 208 671 A1 discloses a braking system of a vehicle with a hydraulic service braking system and an electric parking brake and a method for activating the same. When a brake booster in the hydraulic service braking system is inoperative or restricted in its function, the driver is relieved by suitable activation of the electric parking brake.

It is desirable to improve such a braking system further.

SUMMARY

This is achieved by the apparatus and the method disclosed herein.

The apparatus for operating an electric parking brake of a vehicle comprises a generator, which is designed to provide energy for supplying the electric parking brake of the vehicle with energy, and a control device, which is designed to activate the generator for supplying the electric parking brake with energy depending on a result of a monitoring of an energy supply to the electric parking brake. Consequently, even in the event of a failure of the hydraulic braking system and a main supply for the electric parking brake, deceleration is still possible.

Preferably, the electric parking brake can be supplied with energy by an energy supplying device independently of the generator in a first operating state of the vehicle, the control device being designed to supply the electric parking brake with energy from the generator in addition to or instead of the energy from the energy supplying device in a second operating state of the vehicle. Consequently, the best possible supply of energy can be set situation-dependently.

Preferably, the control device is designed to detect by means of the monitoring a fault in a supply to the electric parking brake by the energy supplying device and to supply the electric parking brake with energy by the generator when the fault occurs. Cases of faults can thus be handled independently of other control units.

Preferably, the apparatus comprises a drive device for the generator, which can be kinematically connected or is kinematically connected to an axle of the vehicle. As long as the vehicle is moving, the generator is consequently driven, in order to make it possible for sufficient energy to be supplied to the electric parking brake.

Preferably, the control device is designed to activate the electric parking brake in the closing direction while the generator is supplying the electric parking brake with energy. This design of the generator and the parking brake makes deceleration of the vehicle possible independently of an availability of the hydraulic braking system or the main energy supply to the electric parking brake.

Preferably, the control device can be supplied with energy from the generator in addition to or instead of the energy from the energy supplying device. This improves the availability of the control unit.

Method for operating an electric parking brake of a vehicle which comprises a generator which is designed to provide energy for supplying the electric parking brake of the vehicle with energy, the generator being activated for supplying the electric parking brake with energy depending on a result of a monitoring of an energy supply to the electric parking brake. This improves the braking system of a vehicle further.

Preferably, the electric parking brake is supplied with energy by an energy supplying device independently of the generator in a first operating state of the vehicle, the electric parking brake being supplied with energy from the generator in addition to or instead of the energy from the energy supplying device in a second operating state of the vehicle. The additional use makes it possible for the main supply to be made smaller in size, and if need be replaced completely.

Preferably, a fault in a supply to the electric parking brake by the energy supplying device is detected by means of the monitoring and the electric parking brake is supplied with energy by the generator when the fault occurs. Particularly in the case of a fault, an improvement of the availability is possible.

Preferably, the generator is driven by a drive device, which is kinematically connected to an axle of the vehicle. This makes it possible for sufficient energy to be supplied by the kinetic energy of the moving vehicle.

Preferably, the electric parking brake is activated in the closing direction while the generator is supplying the electric parking brake with energy. In this way, the deceleration of the vehicle is reliably improved.

Preferably, the control device is supplied with energy from the generator in addition to or instead of the energy from the energy supplying device. This improves the availability of the control device and its functions in the event of a failure of the main supply.

BRIEF DESCRIPTION OF THE DRAWINGS

Further advantageous refinements emerge from the following description and the drawing, in which.

DETAILED DESCRIPTION

Figure 1:
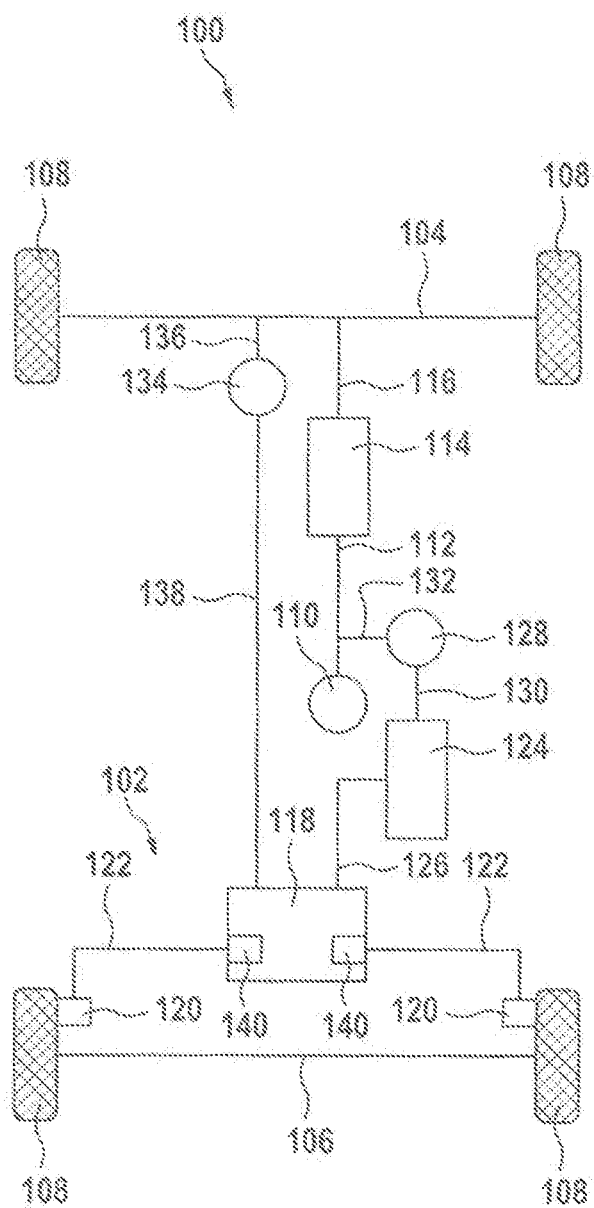
FIG. 1 schematically shows parts of a vehicle with an electric parking brake.

FIG. 1 schematically represents parts of a vehicle 100 with an electric parking brake 102. The vehicle 100 comprises a front axle 104 and a rear axle 106. Arranged on each of the axles, at opposite ends of the respective axle, are two wheels 108. In the example, the front axle 104 is driven by an engine 110, which can be kinematically connected to the front axle 104 by way of an output shaft 112, a transmission 114 and an input shaft 116. In the example, the rear axle 106 is non-powered. The vehicle 100 may also be fitted with rear-wheel drive or all-wheel drive.

The electric parking brake 102 comprises a control unit 118 and actuators 120 arranged on each of the two wheels 108 of the rear axle 106. The actuators 120 are connected to the control unit 118 by way of respective electrical lines 122. In the example, the actuators 120 are drives, to be more precise motors, with which brake pads can be moved.

The electric parking brake 102 is supplied with energy by an energy supplying device 124, for example a battery. In the example, the energy supplying device 124 supplies the control unit 118 with energy by way of an energy supplying line 126. The actuators 120 are supplied with energy by the control unit 118.

For braking the wheels 108, the control unit 118 is designed to activate the actuators 120 into a braking position. In the braking position, the actuators 120 clamp brake disks of the wheels 108 between brake pads, and thereby arrest the vehicle 100. For releasing the wheels 108, the control unit 118 is designed to activate the actuators 120 into a rest position, in which the wheels 108 turn freely. The actuators 120 thereby release clamped brake pads from the brake disks.

For moving the actuators 120 from the rest position into the braking position or back, energy is required. No energy is required to keep the actuators 120 in the rest position or in the braking position.

A hydraulic braking system, which is likewise arranged in the vehicle 100 and is not represented in FIG. 1, is designed to move the brake pads toward the brake disks when required, in order to brake the vehicle 100 to a greater or lesser degree.

In the example, the energy supplying device 124 is a battery, which is charged by an energy generator 128 by way of a charging line 130. In the example, the energy generator 128 is an alternator, which can be driven by way of a kinematic connection 132 to the output shaft 112.

The vehicle 100 also comprises a generator 134, which is designed to provide energy for supplying the electric parking brake 102 of the vehicle 100 with energy. The generator 134 can be kinematically connected or is permanently kinematically connected to an axle of the vehicle 100 by way of a drive device 136. In the example, the generator 134 is kinematically connected to the front axle 104. The drive device 136 is for example a shaft, which is driven by the front axle 104, for example by way of a friction wheel or a friction belt, and turns a rotor of the generator 134 as long as the front axle 104 is rotating. The generator 134 may also be arranged directly on the axle of the vehicle 100, so that the rotor is connected to the axle.

For supplying the electric parking brake 102, the generator 134 is connected to the control unit 118 by way of an electrical line 138.

In a first operating state of the vehicle 100, the electric parking brake 102 can be supplied with energy by the energy supplying device 124 independently of the generator.

In a second operating state of the vehicle 100, the electric parking brake 102 can be supplied with energy by the generator 134 in addition to or instead of the supply by the energy supplying device 124.

The control device 118 is designed to activate the generator 134 for supplying the electric parking brake 102 with energy depending on a result of a monitoring of the energy supply to the electric parking brake 102.

In the first operating state, the generator 134 is not activated for supplying the electric parking brake 102. For example, the generator 134 is kinematically disconnected from the drive device 136 or the electrical line 138 is temporarily interrupted. Conversely, in the second operating state the generator 134 is activated by kinematically connecting the generator to the drive device in a known manner or by removing the interruption of the electrical line 138 to the control unit 118, such as by operating an electrical switch incorporated into the control unit.

The control device is designed to detect by means of the monitoring a fault in the supply to the electric parking brake 102 by the energy supplying device 124 and to supply the electric parking brake 102 with energy by the generator 134 when the fault occurs. The fault lies for example in an inadequate power output of the energy supplying device 124 or in a defect of the energy supplying device 124 or of the energy supplying line 126. Such a fault can be detected for example in the control unit 118 by monitoring the voltage or the current at the energy supplying line 126.

The control device 118 is designed to activate the electric parking brake 102 in the closing direction while the generator 134 is supplying the electric parking brake 102 with energy. The closing direction relates to the direction from the rest position of the actuators 120 into their braking position. The energy of the generator 134 is sufficient to close the electric parking brake 102 while the vehicle 100 is still moving. During operation, the generator 134 likewise brakes the vehicle 100. With a closed electric parking brake 102, the vehicle 100 is decelerated further even without further energy from the generator 134, since the closed electric parking brake 102 does not require any energy when the actuators 120 have reached the braking position. The vehicle 100 is consequently decelerated even in the event of a failure of the hydraulic braking system and the supply by the energy supplying device 124.

The control device 118 may be designed to supply the electric parking brake 102 with energy from the generator 134 in addition to the energy from the energy supplying device 124. A power output of the supply from the energy supplying device 124 can in this case be lower. The energy supplying device 124 can in this case be made smaller in size without restricting the function of the electric parking brake 102.

The control device 118 comprises a respective output stage 140 for each of the actuators 120. The output stages 140 are for example supplied with the energy required for operating the actuators 120 directly from the generator 134. The control unit 118 may likewise be supplied by the energy delivered by the generator 134. In this way, reliable operation of the electric parking brake is ensured even in the event of a failure of the supply by the energy supplying device 124.

Figure 2:
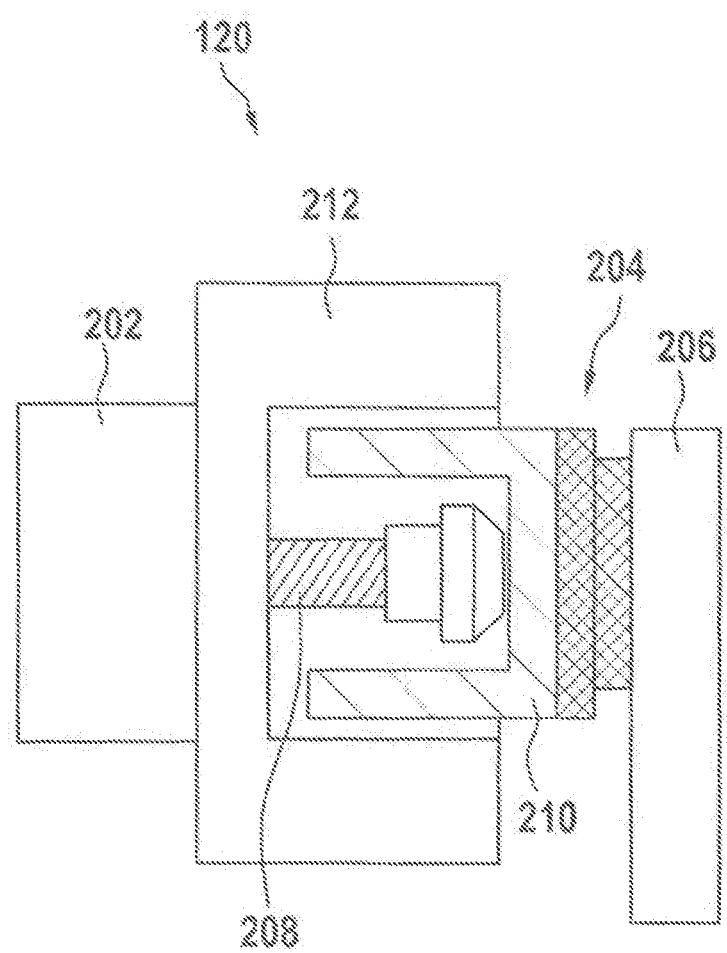
FIG. 2 schematically shows parts of the electric parking brake.

FIG. 2 schematically represents parts of the electric parking brake 102. To be more precise, the actuator 120 is represented in FIG. 2. The actuator 120 comprises a drive 202, in particular a motor, which is designed to move a brake pad 204 back and forth over an air gap in relation to a brake disk 206. In the example, the brake pad 204 is moved by way of a drive device 208, which acts on a brake piston 210. A cylinder 212 guides the brake piston 210.

Figure 3:
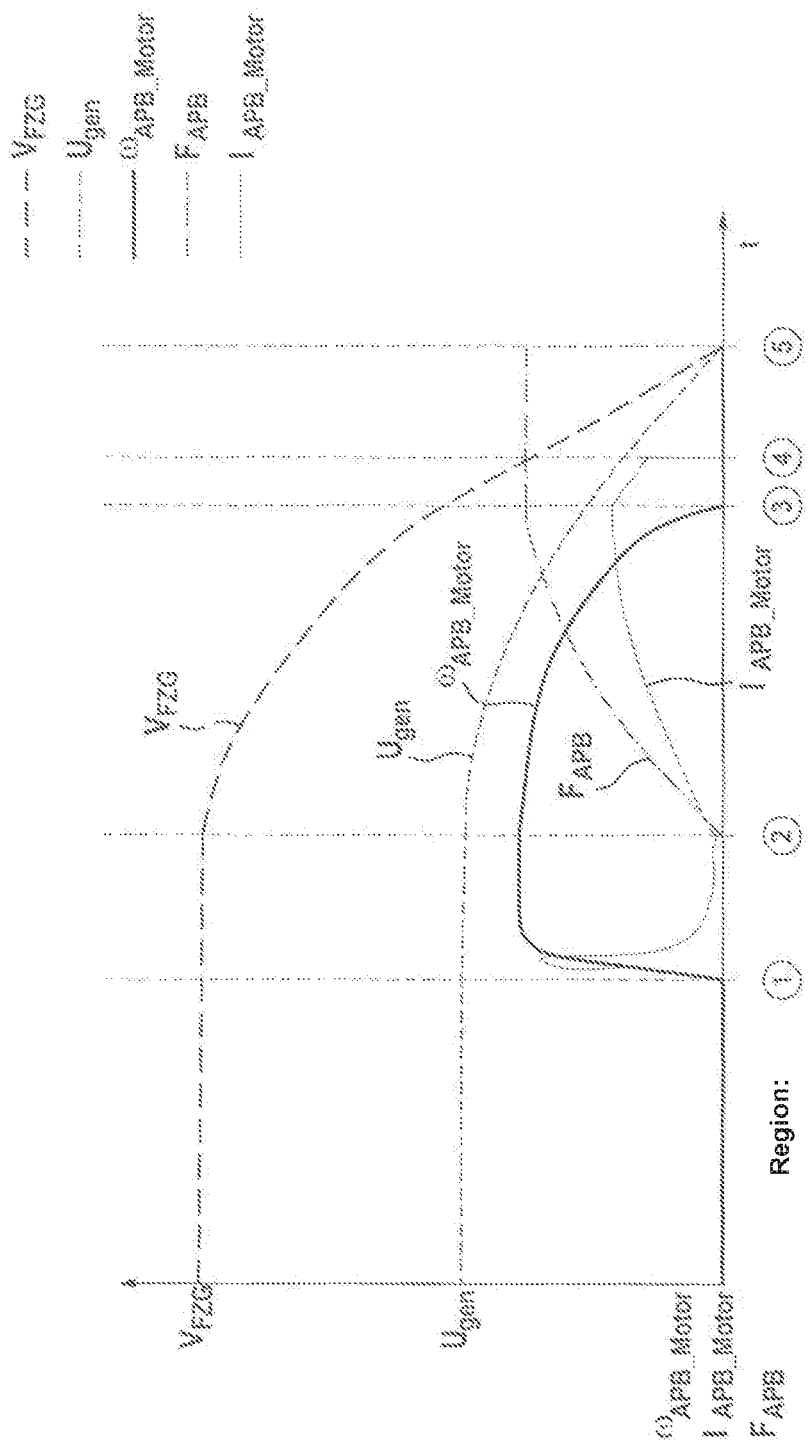
FIG. 3 schematically shows a method for operating the electric parking brake.

A method for operating the electric parking brake 102 is described below on the basis of FIG. 3. FIG. 3 schematically represents a variation over time t of a vehicle speed $V_{FZG}$ of the vehicle 100, a voltage $U_{gen}$ thereby occurring at the generator 134, a rotational speed $\omega_{APB\_Motor}$ of the drive of one of the actuators 120 occurring in the electric parking brake 102, a current $I_{APB\_Motor}$ of this drive and a force $F_{APB}$ thereby occurring on the brake pad or pads. The force $F_{APB}$ is a clamping force. Voltage $U_{gen}$ drives the drive. During idling of the drive, the rotational speed $\omega_{APB\_Motor}$ is proportional to the voltage $U_{gen}$.

The method is divided into five regions at successive times, the respective beginning of which is indicated in FIG. 3, with increasing time t, in an ascending manner by numbers 1 to 5.

Before the region 1, the energy supply is monitored. In the example, the vehicle 100 is moving at a constant vehicle speed $V_{FZG}$ different from zero. The generator 134 is already driven and generates a voltage $U_{gen}$ different from zero, which is proportional to the speed. Before the region 1, there is no supplying of the electric parking brake 102 with energy by the generator 134. The current $I_{APB\_Motor}$ is zero. The electric parking brake 102 is in the rest position, the force $F_{APB}$ occurring is zero.

By means of the monitoring, a fault in a supply to the electric parking brake 102 by the energy supplying device 124 is detected. In the example represented, when the fault occurs, the electric parking brake 102 is supplied with energy by the generator 134 from the point in time indicated by 1. The energy is provided depending on the result of this monitoring. In other words, from the point in time indicated by 1, the electric parking brake 102 is activated in the closing direction while the generator 134 is supplying the electric parking brake 102 with energy.

In the example, an emergency stop by means of the electric parking brake 102 is initiated at the point in time 1.

Between the points in time 1 and 2, the vehicle speed $V_{FZG}$ and the voltage $U_{gen}$ initially remain constant. The rotational speed $\omega_{APB\_Motor}$ of the drive rises sharply up to a maximum value. In the sharp rise, a pulse of the current $I_{APB\_Motor}$ occurs, dying away when the rotational speed $\omega_{APB\_Motor}$ reaches the maximum value. The force $F_{APB}$ initially remains zero.

That is to say that the vehicle speed $V_{FZG}$, and consequently the voltage $U_{gen}$, are constant. The drive of the actuators 120 is activated. The drive reaches its idling speed close to the maximum value within a short time. After a short starting peak, the current $I_{APB\_Motor}$ at the motor falls back to an idling current. The brake pads with the brake linings thus overcome the air gap and move toward the brake disk. The clamping force, force $F_{APB}$, is still at zero. The vehicle 100 is not yet decelerated.

From the point in time 2, the rotational speed $\omega_{APB\_Motor}$ of the drive initially falls slowly, then more quickly, until the rotational speed $\omega_{APB\_Motor}$ reaches zero at the point in time 3. From the point in time 2, the force $F_{APB}$ rises steadily up to a maximum value at the point in time 3. Proportionally in relation to this, the current $I_{APB\_Motor}$ rises and the voltage $U_{gen}$ falls. The vehicle 100 is decelerated by the effect of the electric parking brake 102. The vehicle speed $V_{FZG}$ falls. During the buildup of the force $F_{APB}$, the force $F_{APB}$ is approximately proportional to the motor current $I_{APB\_Motor}$.

The drive has been advanced to the extent that the brake linings are thus in contact with the brake disk. The brake linings then press onto the brake disk. The buildup of the clamping force begins, i.e. the force $F_{APB}$ rises. The motor current, i.e. the current $I_{APB\_Motor}$, increases. The clamping force at the rear wheels then leads to a deceleration of the vehicle 100. The deceleration increases all the more the higher the clamping force is.

From the point in time 3, the force $F_{APB}$ remains constant. As a result, the vehicle speed $V_{FGZ}$ and the voltage $U_{gen}$ fall, and reach zero at the point in time 5. From the point in time 3 to the point in time 4, the current $I_{APB\_Motor}$ falls to zero. Between the point in time 4 and the point in time 5, the current $I_{APB\_Motor}$ is zero. The electric parking brake has already reached the braking position. The vehicle 100 continues to be decelerated.

At the point in time 3, the vehicle speed $V_{FZG}$ has thus fallen to such an extent that the generated voltage $U_{gen}$ is no longer sufficient to keep the drive running. The drive is now stationary. With an electrical resistance value R for the motor, the current $I_{APB\_Motor}$ is obtained from $I_{APB\_Motor}=U_{gen}/R$. The current $I_{APB\_Motor}$ falls linearly with the voltage. The clamping force is now constant and now no longer increases any more. The vehicle deceleration is now also constant and does not increase any more. The vehicle speed $V_{FZG}$ falls linearly to a standstill.

At the point in time 4, the voltage $U_{gen}$ has thus fallen to such an extent that the control unit 118 switches off. The output stage 140 thus switches off. The current $I_{APB\_Motor}$ falls to zero.

At the point in time 5, the vehicle is thus at a standstill and is held by way of a constant clamping force.

In the example, the vehicle is decelerated to a standstill independently of an effect of the hydraulic braking system. As can be seen from the following estimate, the generator 134 provides sufficient energy for this:

Kinetic energy due to the moving vehicle with the mass m=1000 kg and a speed of $V_{FZG}$=2 m/s:

$$E_1 = \tfrac{1}{2} * m * V_{FZG}^2 = 2000 \text{ joules.}$$

Energy for an actuator 120 at a voltage of U=9 V, a current of I=8A and a time duration for moving the actuator into the braking position of t=2 sec:

$$E_2 = U*I*t = 9V*8A*2 \text{ sec} = 144 \text{ joules.}$$

Energy for two actuators 120:

$$E_3 = 2*E_2 = 288 \text{ joules.}$$

Even taking into consideration converter losses in the generator and in the control unit 118, the kinetic energy of the moving vehicle lies well above the energy required for clamping the two actuators 120.

The invention claimed is:

1. An apparatus for operating an electric parking brake of a vehicle, the apparatus comprising:
    a generator configured to provide energy from the generator for supplying the electric parking brake of the vehicle; and
    a control device configured to activate the generator for supplying the electric parking brake with the energy from the generator depending on a result of a monitoring of an energy supply to the electric parking brake.

2. The apparatus according to claim 1, wherein:
    the electric parking brake is supplied with energy from an energy supplying device independently of the generator in a first operating state of the vehicle, and
    the control device is configured to supply the electric parking brake with the energy from the generator in addition to or in place of the energy from the energy supplying device in a second operating state of the vehicle.

3. The apparatus according to claim 2, wherein the control device is configured to detect, via the monitoring of the energy supply, a fault in supply of the energy from the energy supplying device to the electric parking brake, and to supply the electric parking brake with the energy from the generator when the fault is detected.

4. The apparatus according to claim 1, further comprising:
    a drive device for the generator, the drive device configured to be kinematically connected to an axle of the vehicle.

5. The apparatus according to claim 1, wherein the control device is configured to activate the electric parking brake in a closing direction when the generator is supplying the electric parking brake with the energy from the generator.

6. A method for operating an electric parking brake of a vehicle, the method comprising:
    monitoring an energy supply to the electric parking brake; and
    activating a generator, which is configured to provide energy from the generator for supplying the electric parking brake of the vehicle, to supply the electric parking brake with energy depending on the monitoring of the energy supply.

7. The method according to claim 6, wherein:
in a first operating state of the vehicle, the electric parking brake is supplied with energy from an energy supplying device independently of the generator the electric parking brake, and
in a second operating state of the vehicle, supplying the electric parking brake with the energy from the generator in addition to or instead of the energy from the energy supplying device.

8. The method according to claim 7, wherein:
the monitoring further comprises detecting a fault in supply to the electric parking brake of the energy from the energy supplying device, and
the activating of the generator further comprises supplying the electric parking brake with the energy from the generator when the fault is detected.

9. The method according to claim 6, further comprising:
driving the generator with a drive device that is configured to be kinematically connected to an axle of the vehicle.

10. The method according to claim 6, further comprising:
activating the electric parking brake in a closing direction while the generator is supplying the electric parking brake with the energy from the generator.

* * * * *